United States Patent

Rogers et al.

[15] 3,635,316
[45] Jan. 18, 1972

[54] COMBINED FOOT OPERATED THROTTLE AND BRAKE

[72] Inventors: Henry C. Rogers; Fanny L. Rogers, both of P.O. Box 98, Rufus, Oreg. 97050

[22] Filed: Dec. 19, 1969

[21] Appl. No.: 886,671

[52] U.S. Cl. ........................192/3, 192/1, 74/478.5, 74/560
[51] Int. Cl. ........................................F16d 67/00
[58] Field of Search ............192/1; 74/733, 512, 560, 561, 74/513, 478.5

[56] References Cited

UNITED STATES PATENTS

| | | | |
|---|---|---|---|
| 1,608,809 | 11/1926 | Quintenz | 192/1 X |
| 1,882,927 | 10/1932 | Rockwell | 192/1 X |
| 1,907,009 | 5/1933 | Rockwell | 192/1 X |
| 2,730,214 | 1/1956 | Scott | 74/560 X |
| 3,331,479 | 7/1967 | Pascual | 74/560 X |
| 3,386,541 | 6/1968 | Luist | 74/560 X |

*Primary Examiner*—Clarence R. Gordon
*Attorney*—Berman, Davidson and Berman

[57] ABSTRACT

A combined foot operated throttle and brake for motor vehicles in which the linkage is such that the normal braking action of straightening the knee is used for applying the brake while the normal throttling operation of pivoting the foot at the ankle is used for operating the throttle. The linkage is adjustable to fit the specific requirements of an individual driver and incorporates a safety feature in that the throttle is closed when the brakes are applied.

4 Claims, 4 Drawing Figures

PATENTED JAN 18 1972

INVENTORS.
HENRY C. ROGERS,
FANNY L. ROGERS,
BY
Berman, Davidson & Berman,
ATTORNEYS.

PATENTED JAN 18 1972  3,635,316

INVENTORS.
HENRY C. ROGERS,
FANNY L. ROGERS,
BY
Berman, Davidson & Berman,
ATTORNEYS.

COMBINED FOOT OPERATED THROTTLE AND BRAKE

BACKGROUND OF THE INVENTION

Field of the Invention

The present invention relates to the control of the brake and throttle of a motor vehicle of the type which is equipped with hydraulic brakes and an internal combustion engine having a rotatable throttle valve associated therewith.

SUMMARY OF THE INVENTION

The present invention is directed to a combined foot operated throttle and brake control which includes a foot pedal which is mounted for swinging movement about a transverse pivot positioned substantially above the pedal and is also mounted for pivotal movement about a transverse pivot mounted at the lower end of the pedal. Linkage is provided to actuate the brakes of the vehicle when the pedal is swung forwardly about the upper transverse pivot and to actuate the throttle when the pedal is pivotted about the lower transverse pivot.

The primary object of the invention is to provide a combined throttle and brake operator in which the motion of the driver's leg to apply the brakes is identical to the motion involved in a conventional automobile and the motion of the driver's foot in actuating the throttle is identical to that of a driver's foot in a conventional automobile.

Other objects and advantages will become apparent in the following specification when considered in light of the attached drawings.

DESCRIPTION OF THE PREFERRED EMBODIMENT

Figures 1, 2:
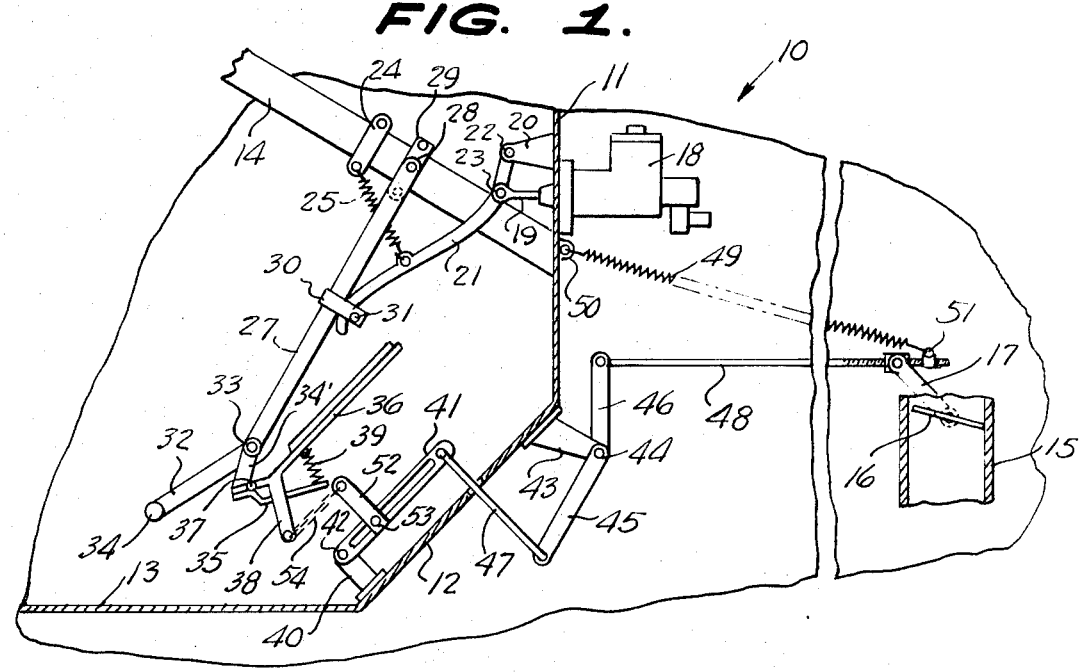
FIG. 1 is a side elevation of the invention showing the position of the linkage with the brake released and the throttle closed with parts broken away and in section for convenience of illustration.
FIG. 2 is a top plan view of the structure illustrated in FIG. 1 shown partially broken away and in section for convenience of illustration.

Referring now to the drawings in detail wherein like reference characters indicate like parts throughout the several figures the reference numeral 10 indicates generally a combined brake and throttle operator for a motor vehicle.

The operator 10 is attached to a motor vehicle shown fragmentarily and including a fire wall 11, a sloped footrest 12, and a floor board 13 of all conventional construction. A steering post 14 extends through the fire wall in a conventional manner and extends upwardly at an angle thereto. An air and gasoline intake throat 15 forms a part of the internal combustion engine (not shown) and incorporates a rotatable throttle valve 16 which conventionally closes the throat 15 when the internal combustion engine is idling. The throttle valve 16 has a crank arm 17 secured thereto in a manner so that movement of the crank arm 17 away from the fire wall 11 will open the throttle valve 16 to permit flow through the throat 15 and movement of the crank 17 rearwardly toward the fire wall 11 will close the throttle valve 16.

A conventional hydraulic brake master cylinder 18 is mounted on the fire wall 11 and has a conventional piston rod 19 which extends through the fire wall 11 into the passenger compartment. The structure described above is conventionally found on motor vehicles and the combined foot operated brake and throttle control is attached to and used therewith.

A bracket 20 is mounted on the fire wall 11 and has an S-curved lever arm 21 secured thereto by a pivot pin 22. The piston 19 is secured to the lever arm 21 by a pivot pin 23 at a position close to but spaced from the pivot pin 22. A clamp 24 is mounted on the steering post 14 and a tension coil spring 25 has one end secured to the clamp 24 and the opposite end secured to an eye 26 formed on the lever arm 21. The spring 25 normally maintains the lever arm 21 in its rearmost position with the piston rod 19 in a brake release position.

A lever 27 is secured at its upper end by a pivot 28 to a clamp 29 encircling the steering post 14. A U-shaped guide 30 is secured to the lever 27 intermediate the opposite ends thereof and the S-shaped lever 21 has its lower end slidably positioned therebetween and retained therein by a removable pin 31. Swinging movement of the lever 27 on the pivot 28 presses the S-shaped lever 21 inwardly toward the fire wall 11 to move the piston rod 19 inwardly of the master cylinder 18 to apply the brakes.

An L-shaped foot support 32 is adjustably secured to the lower end of the lever 27 by means of a bolt 33. The L-shaped footrest 32 has a transverse extension 34 which is adapted to engage behind the foot of the driver for reasons to be assigned.

A foot pedal bracket 34' is also secured to the lever 27 by the bolt 33 and has a base plate 35 extending outwardly and upwardly therefrom. A foot pedal 36 is pivotally mounted by a pivot pin 37 to the base plate 35. An arm 38 projects downwardly from the foot pedal 36 adjacent its lower end for reasons to be assigned. A compression spring 39 extends between the bottom of the foot pedal 36 and the upper end of the base plate 35 to normally bias the foot pedal 36 in a counterclockwise direction about the pivot pin 37.

A bracket 40 is secured to the sloping floor 12 adjacent the floor board 13 and has a longitudinally slotted bar 41 pivotally secured thereto by a pivot pin 42.

A U-shaped bracket 43 is secured to the underside of the sloping floor 12 adjacent the fire wall 11 and has an offset bell crank lever 44 mounted pivotally therein. The bell crank lever 44 has a lower arm 45 on one end thereof and an upper arm 46 on the other end thereof extending nearly oppositely of each other. A link 47 is pivotally secured to the upper end of the bar 41 and to the lower end of the arm 45 and a link 48 is pivotally secured to the upper end of the arm 46 and is adjustably and pivotally secured to the throttle 17. A tension spring 49 is secured to an eye 50 on the fire wall 11 and to a second eye 51 on the link 48. The tension spring 49 normally biases the link 48 in a direction toward the fire wall 11 so as to pivot the throttle valve 16 to closed position when no pressure is on the pedal 36.

A plate 52 is secured to the bar 41 by a bolt 53 which extends through the slot in the slotted bar 41. By loosening the bolt 53 in the link 52 can be adjusted to any desired position along the bar 41. A chain 54 extends between the link 52 and the lever 38 to provide a flexible connection therebetween.

Figure 3:
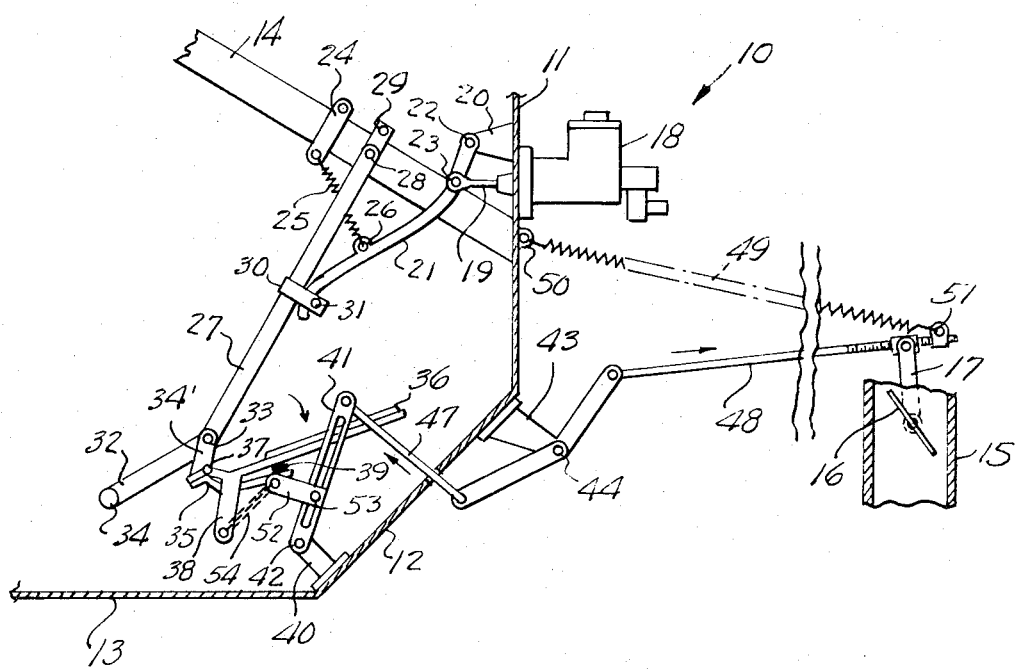
FIG. 3 is a view similar to FIG. 1 with linkage in a position so that the brakes are released and the throttle is partially opened.

In the use and operation of the invention the foot of the driver is placed on the foot pedal 36 and by pivoting the foot at the ankle or pressing the toes forwardly the foot pedal 36 is caused to pivot about the pivot pin 37 moving the lever 38 in a clockwise direction so as to draw the chain 54 rearwardly pulling the link 52 and the bar 41 upwardly to the position illustrated in FIG. 3. The link 47 is thus moved rearwardly while the link 48 is moved forwardly to pivot the throttle valve 16 to any desired open position. The coil spring 39 and the coil spring 49 together will return the throttle 16 and the pedal 36 to their starting positions as illustrated in FIG. 1 when pressure is no longer brought to bear on the foot pedal 36.

Figure 4:
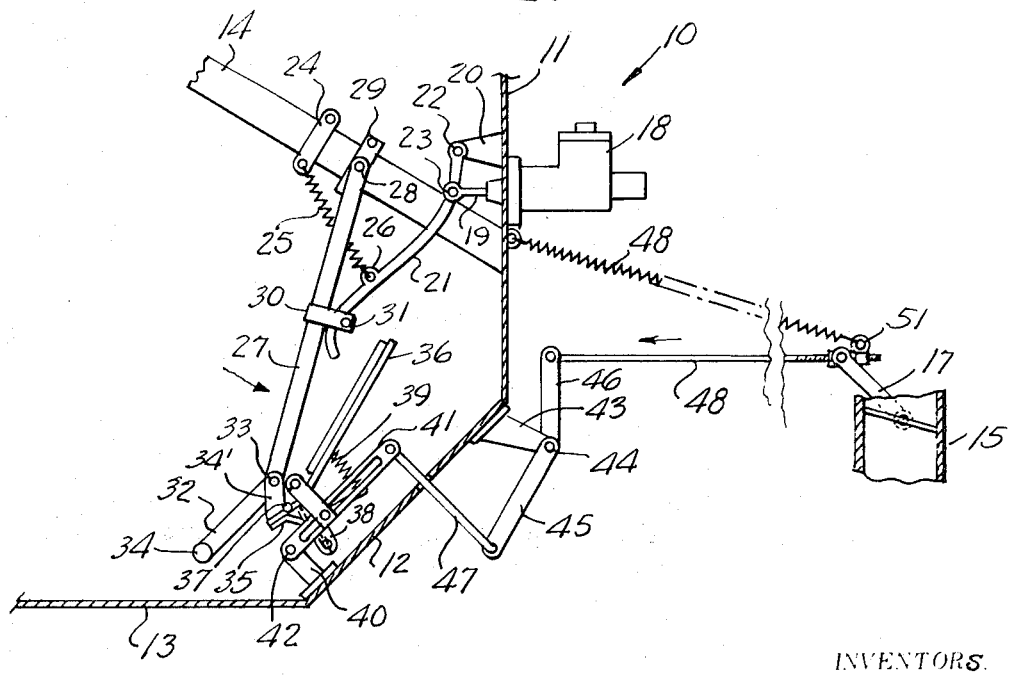
FIG. 4 is a view similar to FIG. 1 showing the linkage in a position with the throttle closed and the brakes applied.

When braking action is desired the driver straightens his knee thrusting his leg forward thus causing the lever 27 to swing forwardly about the pivot 28 which in turn moves the S-shaped lever 21 forwardly to actuate the hydraulic brakes. As the lever 27 swings forwardly the lever 38 moves toward the link 52 permitting the bar 41 to return to its position parallel to the floor 12 even though the foot pedal 36 may be in the depressed position which would normally open the throttle valve 16. As the lever 27 swings to its furthermost forward position as illustrated in FIG. 4, the lever 38 swings to a position with its lower end beneath the bar 41 so that even if the bar 41 has not returned to its position parallel to the floor 12 it will then be forced to return by pressure of the chain 54.

The operation of the foot pedal 36 in the instant invention is such that no new driving motions must be learned by the driver in adapting himself to the use thereof. The normal action of pivoting his foot at the ankle or thrusting the toes forward is used for actuating the throttle valve while the straightening of the leg at the knee or thrusting the whole foot forward is used for actuating the brakes.

Having thus described the preferred embodiment of the invention it should be understood that numerous structural modifications and adaptations may be resorted to without departing from the spirit of the invention.

What is claimed is:

1. A combined foot operated brake and throttle control system for motor vehicles of the type including wheel brakes and a throttle valve controlled engine comprising: a foot pedal, means suspending the foot pedal on the motor vehicle for swinging movement about a horizontal transverse pivot, transverse horizontal pivot means pivotally securing the lower end of said foot pedal to the foot pedal suspending means, a lever arm connecting the foot pedal suspending means to a brake actuator on the motor vehicle to actuate the brakes on swinging movement of said foot pedal, a bar secured at one end to the motor vehicle by a second transverse horizontal pivot to a position generally underlying said foot pedal suspending means, link means connecting the free end of said bar to said throttle valve to positively open said throttle valve on pivotal movement of said bar toward said suspending means and to positively close said throttle valve on pivotal movement of said bar away from said suspending means, flexible means connecting said foot pedal with said bar to positively move said bar in a throttle opening direction on forward pivotal movement of said foot pedal and to positively move said bar in a throttle closing direction on swinging movement of said foot pedal suspending means in a brake actuating direction.

2. A device as claimed in claim 1, wherein said flexible means connecting said foot pedal with said bar permits swinging movement of said foot pedal independently of the means connecting said bar to said throttle valve.

3. A device as claimed in claim 1, wherein longitudinally adjustable means is provided on said bar for connection of said flexible means to said bar to vary the position of said foot pedal with respect to the position of said valve.

4. A device as claimed in claim 1, wherein a heel support means is provided on the means suspending said foot pedal for swinging movement to support the heel of the driver's foot when in engagement with said foot pedal.

* * * * *